(12) United States Patent
Mo et al.

(10) Patent No.: US 8,661,027 B2
(45) Date of Patent: Feb. 25, 2014

(54) VERTICAL SEARCH-BASED QUERY METHOD, SYSTEM AND APPARATUS

(75) Inventors: Yi Mo, Hangzhou (CN); Wei Ning, Hangzhou (CN); Xuping Nie, Hangzhou (CN); He Xiao, Hangzhou (CN); Qile Fu, Hangzhou (CN)

(73) Assignee: Alibaba Group Holding Limited, Grand Caymen (KY)

( * ) Notice: Subject to any disclaimer, the term of this patent is extended or adjusted under 35 U.S.C. 154(b) by 0 days.

(21) Appl. No.: 13/202,172

(22) PCT Filed: Apr. 26, 2011

(86) PCT No.: PCT/US2011/033977
§ 371 (c)(1),
(2), (4) Date: Aug. 18, 2011

(87) PCT Pub. No.: WO2011/137125
PCT Pub. Date: Nov. 3, 2011

(65) Prior Publication Data
US 2013/0054569 A1    Feb. 28, 2013

(30) Foreign Application Priority Data

Apr. 30, 2010    (CN) .......................... 2010 1 0160535

(51) Int. Cl.
*G06F 17/30* (2006.01)
(52) U.S. Cl.
USPC ....................................... 707/722
(58) Field of Classification Search
USPC ................................. 707/705, 722
See application file for complete search history.

(56) References Cited

U.S. PATENT DOCUMENTS

| | | | |
|---|---|---|---|
| 7,152,059 B2 | 12/2006 | Monteverde | |
| 7,805,432 B2 | 9/2010 | Smyth et al. | |
| 7,836,083 B2 | 11/2010 | Cipollone | |
| 2003/0217069 A1* | 11/2003 | Fagin et al. | 707/102 |
| 2004/0260677 A1 | 12/2004 | Malpani et al. | |
| 2005/0289140 A1 | 12/2005 | Ford et al. | |
| 2006/0036581 A1 | 2/2006 | Chakrabarti et al. | |
| 2006/0117002 A1 | 6/2006 | Swen | |
| 2006/0184545 A1 | 8/2006 | Suzuki | |
| 2007/0027840 A1* | 2/2007 | Cowling et al. | 707/3 |
| 2007/0038608 A1 | 2/2007 | Chen | |
| 2007/0106662 A1* | 5/2007 | Kimbrough et al. | 707/5 |

(Continued)

OTHER PUBLICATIONS

The PCT Search Report and Written Opinion mailed Jul. 8, 2011 for PCT application No. PCT/US11/33977, 9 pgs.

(Continued)

*Primary Examiner* — Neveen Abel Jalil
*Assistant Examiner* — Matthew Ellis
(74) *Attorney, Agent, or Firm* — Lee & Hayes, PLLC

(57) ABSTRACT

Various embodiments of a method, system, and apparatus related to query based on vertical search are disclosed. In one aspect, a method of query based on vertical search receives a user query. The method obtains a first category model from a category model warehouse based on the user query to generate a first query result. The first category model includes one or more commodity categories that correspond to one or more keywords in the user query. The method also obtains one or more commodity categories corresponding to the user query from a commodity warehouse to generate a second query result. The method further generates a final query result by combining the first query result and the second query result.

18 Claims, 10 Drawing Sheets

(56) References Cited

U.S. PATENT DOCUMENTS

| | | |
|---|---|---|
| 2008/0052277 A1* | 2/2008 | Lee .................................. 707/3 |
| 2008/0256121 A1* | 10/2008 | Liu et al. ....................... 707/102 |
| 2008/0313142 A1 | 12/2008 | Wang et al. |
| 2009/0030800 A1* | 1/2009 | Grois .............................. 705/14 |
| 2009/0094223 A1 | 4/2009 | Berk et al. |
| 2009/0144168 A1 | 6/2009 | Grouf et al. |
| 2009/0228774 A1* | 9/2009 | Matheny et al. .............. 715/201 |
| 2009/0322756 A1* | 12/2009 | Robertson et al. ............ 345/440 |
| 2010/0076964 A1 | 3/2010 | Parrell |
| 2010/0268723 A1 | 10/2010 | Buck |
| 2010/0281013 A1* | 11/2010 | Graefe ......................... 707/715 |
| 2010/0299342 A1 | 11/2010 | Gustafson et al. |
| 2011/0047161 A1 | 2/2011 | Myaeng et al. |

OTHER PUBLICATIONS

Chinese Office Action mailed Jul. 23, 2013 for Chinese patent application No. 2010101605357, a counterpart foreign application of U.S. Appl. No. 13/202,172, 19 pages.

* cited by examiner

VERTICAL SEARCH-BASED QUERY METHOD, SYSTEM AND APPARATUS

CROSS REFERENCE TO RELATED PATENT APPLICATIONS

This application is a national stage application of an international patent application PCT/US11/33977, filed Apr. 26, 2011, which claims priority from Chinese Patent Application No. 201010160535.7, filed Apr. 30, 2010, entitled "Vertical Search-Based Query Method, System and Apparatus," which applications are hereby incorporated in their entirety by reference.

TECHNICAL FIELD

The present disclosure relates to the network technology field and, more specifically, to the method, system and apparatus for vertical search-based query

BACKGROUND

With the continuing development of the Internet, more and more information is stored on the Internet. To obtain information from any field of knowledge, a user typically utilizes a search engine. Given the large volumes of information on the Internet, common query methods frequently result in search results that are inaccurate. Consequently, a vertical search method has been developed. Vertical search refers to field or business-specific search that targets a particular field or business by a vertical search engine, which is the subdivision and extension of a search engine. A vertical search engine integrates information of the targeted field collected from a webpage warehouse. After segmentation to obtain necessary data for processing, the vertical search engine sends the results to the user in a certain form. In view of common search engines that deal with large volumes of information and produce search results that are not sufficiently accurate or thorough, a new model of search engine service is being promoted. By providing specific information targeted for a field, a group of people or a need, valuable services can be provided by vertical search. Words such as "specialized, precise, thorough" may be appropriate description of vertical search, in addition to its business-oriented nature. In contrast to the common search engines that produce immense amount of unordered information, vertical search engines tend to have better precision, specificity and thoroughness.

There are many applications for vertical search engines. For example, corporate warehouse searches, supply and demand information searches, shopping searches, real estate searches, talent searches, map searches, MP3 searches, and image searches may benefit from vertical searches. Practically, the search for any kind of information can be further refined by a respective type of vertical search engine.

When a vertical search engine is used for a shopping search, the user inputs a commodity search keyword into a business-to-consumer (B2C) or consumer-to-consumer (C2C) shopping website. As shown in FIG. 1A and FIG. 1B, the search result often comprises multiple parts: 1. the navigation information of the commodity, such as the commodity category, 2. the attribute category corresponding to the commodity category, and 3. the commodity under the commodity category. For navigation, the commodity classification names are organized in a tree-like structure, and such organization makes it convenient for a user to follow the tree structure in a top-down fashion to obtain more accurate search results according to commodity classification names. The attribute category refers to one or more commodity attributes most-commonly sought after by the user, based on historical hit data of the commodity category.

The commodity category tree structure is stored in a data table in a database. The entry and maintenance of data is manually done. Whether in a B2C or C2C website, the display of each commodity must be classified in one or more nodes of the commodity category tree.

Current e-commerce websites tend to have tremendous amount of commodities, resulting in excessive classification of commodities. In the case of multi-billion product lines, the commodity category tree may have up to tens of thousands of nodes with the number of nodes for each level of category often being in multiple dozens. When a user initiates a search, the amount of commodity classification information presented to the user is excessive, resulting in difficulty in advising the user which one or ones of the presented classifications may be more relevant to the user's interest. To address this problem, an existing approach is to count the number of returned results under each category and rank the commodities in a descending order based on the number counts. A threshold is set so that the category of a type of commodity with numbers lower than this threshold is hidden from the user. This is intended to reduce the amount of classification.

The following problems associated with the current technology have been observed:

(1) the relevance of the categories presented to the user's query is very low;

(2) there is no mechanism to indicate the relative importance of one category relative to another; and (3) One or more categories of high importance may be inadvertently hidden as a result of a threshold to hide the one or more categories from the user.

SUMMARY

The present disclosure provides various embodiments of a method, a system, and an apparatus of query based on vertical searches. The embodiments can improve the query results relevance and effectiveness.

In one aspect, a method of query based on a vertical search may comprise: receiving a user query; obtaining a first category model from a category model warehouse based on the user query to generate a first query result, the first category model including one or more commodity categories that correspond to one or more keywords in the user query; obtaining one or more commodity categories corresponding to the user query from a commodity warehouse to generate a second query result; and generating a final query result by combining the first query result and the second query result.

The method may further comprise: transmitting the final query result to a user; generating a log based on the user query and the user's clicking operations in response to the final query result; generating a second category model from statistical analysis of data in the log; and updating the category model warehouse with the second category model.

In one embodiment, the first category model may comprise one or more attribute categories corresponding to the one or more commodity categories, and wherein generating the second query result comprises obtaining one or more commodity categories and associated attribute categories that match the user query.

In one embodiment, the user query may consist of one or more keywords inputted by a user. The obtaining the first category model from the category model warehouse based on the user query to generate the first query result may comprise: determining whether a keyword corresponding to the first category model matches any of the one or more keywords in the user query; in an event that a keyword corresponding to the first category model matches any of the one or more keywords in the user query: obtaining a third category model that matches the keyword of the one or more keywords in the user query that matches in the keyword corresponding to the first category model; and generating the first query result using the third category model, one or more corresponding weights, one or more attribute categories of one or more direct attributes, and one or more weights corresponding to the one or more attribute categories; in an event that keywords corresponding to the first category model do not include any of the one or more keywords in the user query: revising the one or more keywords in the user query and repeating the determining until a fourth category model that matches any of the revised one or more keywords in the user query is obtained; and generating the first query result using the third category model or the fourth category model, one or more corresponding weights, one or more attribute categories of one or more direct attributes, and one or more weights corresponding to the one or more attribute categories.

In one embodiment, when the user query comprises one or more keywords inputted by a user and one or more commodity categories selected by the user, the obtaining the first category model from the category model warehouse based on the user query to generate the first query result may comprise: determining whether keywords corresponding to the first category model include any of the one or more keywords in the user query; in an event that a keyword corresponding to the first category model matches any of the one or more keywords in the user query: obtaining a third category model that matches the keyword of the one or more keywords in the user query that matches in the keyword corresponding to the first category model; and generating the first query result using the third category model, one or more corresponding weights, one or more attribute categories of one or more direct attributes, and one or more weights corresponding to the one or more attribute categories; in an event that a keyword corresponding to the first category model does not match any of the one or more keywords in the user query: revising the one or more keywords in the user query and repeating the determining until a fourth category model that matches any of the revised one or more keywords in the user query is obtained; and obtaining a fifth category model that matches the one or more commodity categories selected by the user in the user query from the third category model or the fourth category model; and generating the first query result using commodity categories in the fifth category model and corresponding weights thereof In one embodiment, the generating the final query result by combining the first query result and the second query result may comprise: obtaining a first combined result comprising commodity categories that are in both the first query result and the second query result, the first combined result further comprising weights corresponding to the commodity categories in the first combined result and being a combination of those weights from the first query result and from the second query result; obtaining a second combined result comprising commodity categories and corresponding weights in the second query result; increasing the weights in the first combined result to render weights corresponding to the commodity categories in the first combined result to be respectively higher than the weights corresponding to the commodity categories in the second combined result; and arranging the commodity categories in the first combined result according to the corresponding weights in a descending order to provide the first combined result to a user.

In one embodiment, the generating the final query result by combining the first query result and the second query result may comprise: obtaining a first combined result comprising commodity categories and associated attribute categories that are in both the first query result and the second query result, the first combined result further comprising weights corresponding to the commodity categories and the associated attribute categories in the first combined result and being a combination of those weights from the first query result and the second query result; obtaining a second combined result comprising commodity categories and associated attribute categories in the second query result, the second combined result further comprising weights corresponding to the commodity categories and the associated attribute categories in the second query result; increasing the weights in the first combined result to render weights corresponding to the commodity categories and attribute categories corresponding to the commodity categories in the first combined result to be respectively higher than the weights corresponding to the commodity categories and attribute categories corresponding to the commodity categories in the second combined result; and arranging the commodity categories and the associated attribute categories in the first combined result according to the corresponding weights in a descending order to provide the first combined result to a user.

In one embodiment, the generating the log based on the user query and the user's clicking operations in response to the final query result may comprise: obtaining data on the user's clicking operations with respect to commodity categories, attribute categories corresponding to the commodity categories, and commodities in response to the final query result; generating the log based on the data on the user's clicking operations, the log comprising the user query and corresponding clicking information, the clicking information comprising a commodity category and an attribute category of a commodity clicked on by the user, a commodity category clicked on by the user, and a attribute category clicked on by the user; and storing the generated log.

In one embodiment, the generating the second category model from statistical analysis of data in the log may comprise: obtaining a statistical analysis result based on statistical analysis of the user query and corresponding clicking information in the log, the statistical analysis result comprising commodity categories, associated attribute categories, and weights corresponding to the commodity categories and the associated attribute categories that correspond to the user query, the weights corresponding to the commodity categories and the associated attribute categories comprising number of clicks on the commodity categories and the associated attribute categories, clicking probability related to the commodity categories and the associated attribute categories, or both; and arranging the statistical analysis result as a category tree to generate the second category model.

In one embodiment, the arranging the statistical analysis result as a category tree to generate the second category model may comprise: determining whether the commodity categories, associated attribute categories, and weights corresponding to the commodity categories and the associated attribute categories that correspond to the user query reach one or more weight thresholds; and in an event that the one or more weight thresholds are reached, generating the category model based on the commodity categories, associated attribute categories, and weights corresponding to the commodity categories and the associated attribute categories that correspond to the user query.

In another aspect, a query system based on a vertical search may comprise: a query server that: receives a user query;

obtains a first category model from a category model warehouse based on the user query to generate a first query result, the first category model including one or more commodity categories that correspond to one or more keywords in the user query; obtains one or more commodity categories corresponding to the user query from a commodity warehouse to generate a second query result; and generates a final query result by combining the first query result and the second query result. The query system may also comprise a log server that generates a log based on the user query and user's clicking operations in response to the final query result. The query system may further comprise a modeling server that generates a second category model from statistical analysis of data in the log.

In one embodiment, the modeling server may transmit the second category model to the query server, and the query server may provide the final query result to a user, and updates the category model warehouse with the second category model.

In one embodiment, the first category model may comprise one or more attribute categories corresponding to the one or more commodity categories, and the query server may obtain one or more commodity categories and attribute categories corresponding to the user query from the commodity warehouse.

In one embodiment, the query server may obtain data on the user's clicking operations with respect to commodity categories, attribute categories corresponding to the commodity categories, and commodities in response to the final query result. The log server may generate the log based on the data on the user's clicking operations, the log comprising the user query and corresponding clicking information, the clicking information comprising a commodity category and an attribute category of a commodity clicked on by the user, a commodity category clicked on by the user, and a attribute category clicked on by the user. The log server may further store the generated log.

In one embodiment, the modeling server may further: obtain a statistical analysis result based on statistical analysis of the user query and corresponding clicking information in the log, the statistical analysis result comprising commodity categories, associated attribute categories, and weights corresponding to the commodity categories and the associated attribute categories that correspond to the user query, the weights corresponding to the commodity categories and the associated attribute categories comprising number of clicks on the commodity categories and the associated attribute categories, clicking probability related to the commodity categories and the associated attribute categories, or both; and arrange the statistical analysis result as a category tree to generate the second category model.

In one embodiment, the modeling server may further: determine whether weights corresponding to the commodity categories and the associated attribute categories that correspond to the user query reach one or more weight thresholds; and in an event that the one or more weight thresholds are reached, generate the category model based on the commodity categories, associated attribute categories, and weights corresponding to the commodity categories and the associated attribute categories that correspond to the user query.

In yet another aspect, a query server may comprise: a acquisition module that obtains a user query; a query module that, based on the user query, retrieves a category model matching the user query from a category model warehouse, generates a first query result based on the category model, and searches for commodity categories that match the user query in a commodity warehouse to generate a second search result, the category model comprising one or more commodity categories corresponding to one or more keywords in the user query; and a combination module that combines the first query result and the second query result to generate a final query result.

In one embodiment, the query server may further comprise a transmission module that: transmits the final query result to a user; generates a log based on the user query and the user's clicking operations in response to the final query result; generates a second category model from statistical analysis of data in the log; and updates the category model warehouse with the second category model.

In one embodiment, the first category model may comprise one or more attribute categories corresponding to the one or more commodity categories, and the query module may obtain one or more commodity categories and associated attribute categories that match the user query.

Embodiments according to the present disclosure have the following advantages: The user's search is optimized because the historical clicking operation information of the user from the category model and commodity warehouse are combined. By combining the first and second query results, the more relevant commodity model can be provided to the user. In addition, compared to existing technology, the disclosure only needs to find from the category and commodity warehouses the matching commodity category, and the commodity category for ordering results is only a part of all the commodity categories. This is in contrast to the existing technology where one needs to count the commodity in each category, and based on the number of commodities, the commodity categories are arranged. Thus, the embodiments lessen the category sorting time, and can speed up the generation of query results.

BRIEF DESCRIPTION OF THE DRAWINGS

Figures listed below are provided in order to clearly explain the various embodiments or the details of currently existing technology. The figures listed below illustrate merely a few exemplary implementations of the present disclosure. A person of ordinary skill in the art can obtain other implementations based on the ones listed below.

DETAILED DESCRIPTION

One embodiment of the present disclosure comprises: searching a category model warehouse and a commodity warehouse in response to a user's clicking operation, combining search results to form a final search result, and returning the final search result warehouse to the user. This technique enhances the relevance of the search result to the user's intention, thereby improving user experience. The category model is based on commodity categories corresponding to keywords. The category model is also based on attribute categories corresponding to the commodity categories derived from keywords in the user's records of search history and corresponding clicking history. When commodity categories and attribute categories within the category model are based on the user's query keyword, the search results are arranged according to the category model in a tree-like structure. The commodity warehouse refers to a database where commodity categories are stored and arranged according to a commodity category tree. Navigation through the commodities is done by using the categories of the commodities. The database also stores attribute information of each commodity.

Below, the technological scheme of the present disclosure is explained with clear and complete descriptions. Of course, the following includes merely illustrative descriptions of the exemplary implementation of the various embodiments. It is understood that other implementations obtained by a person skilled in the art would still be within the scope of the present disclosure.

Figure 1A:
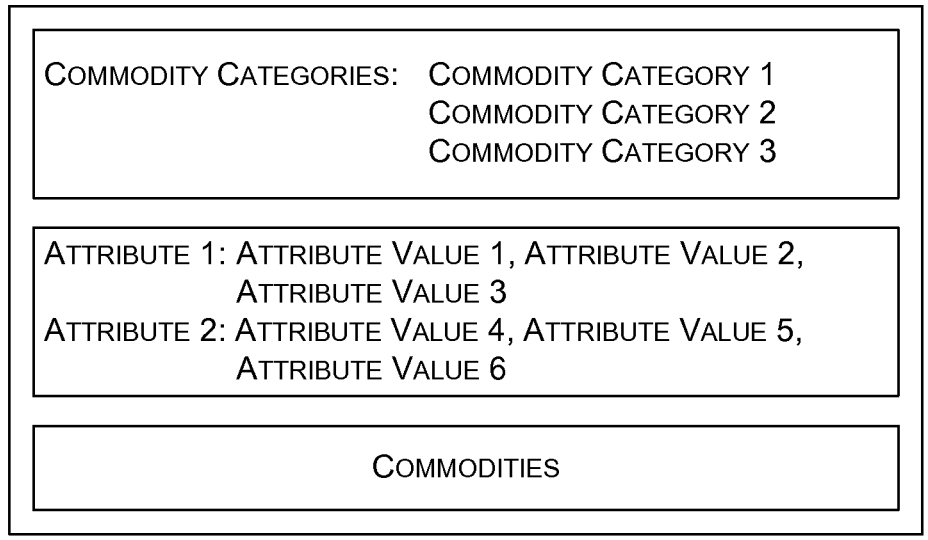
FIG. 1A shows a diagram of query results with the existing technology.
Figure 1B:
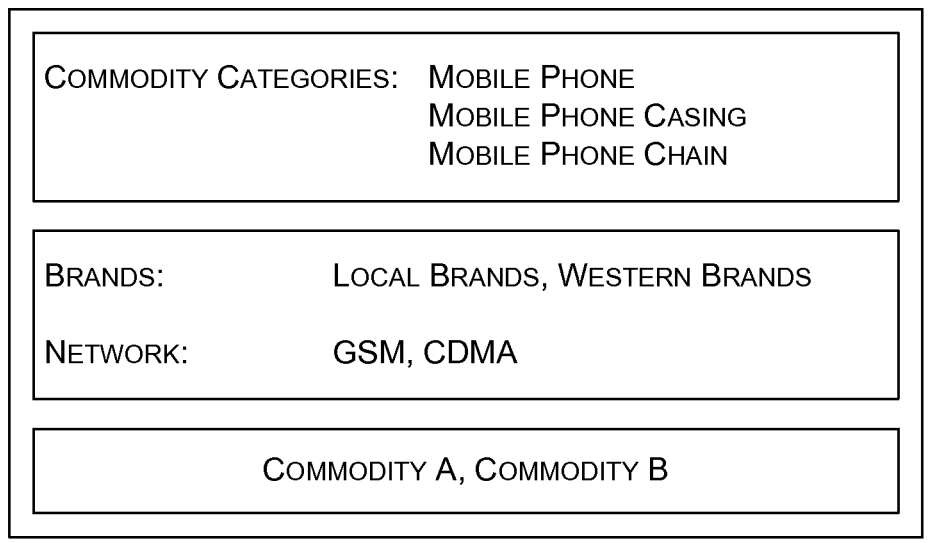
FIG. 1B shows another diagram of query results with the existing technology.
Figure 2:
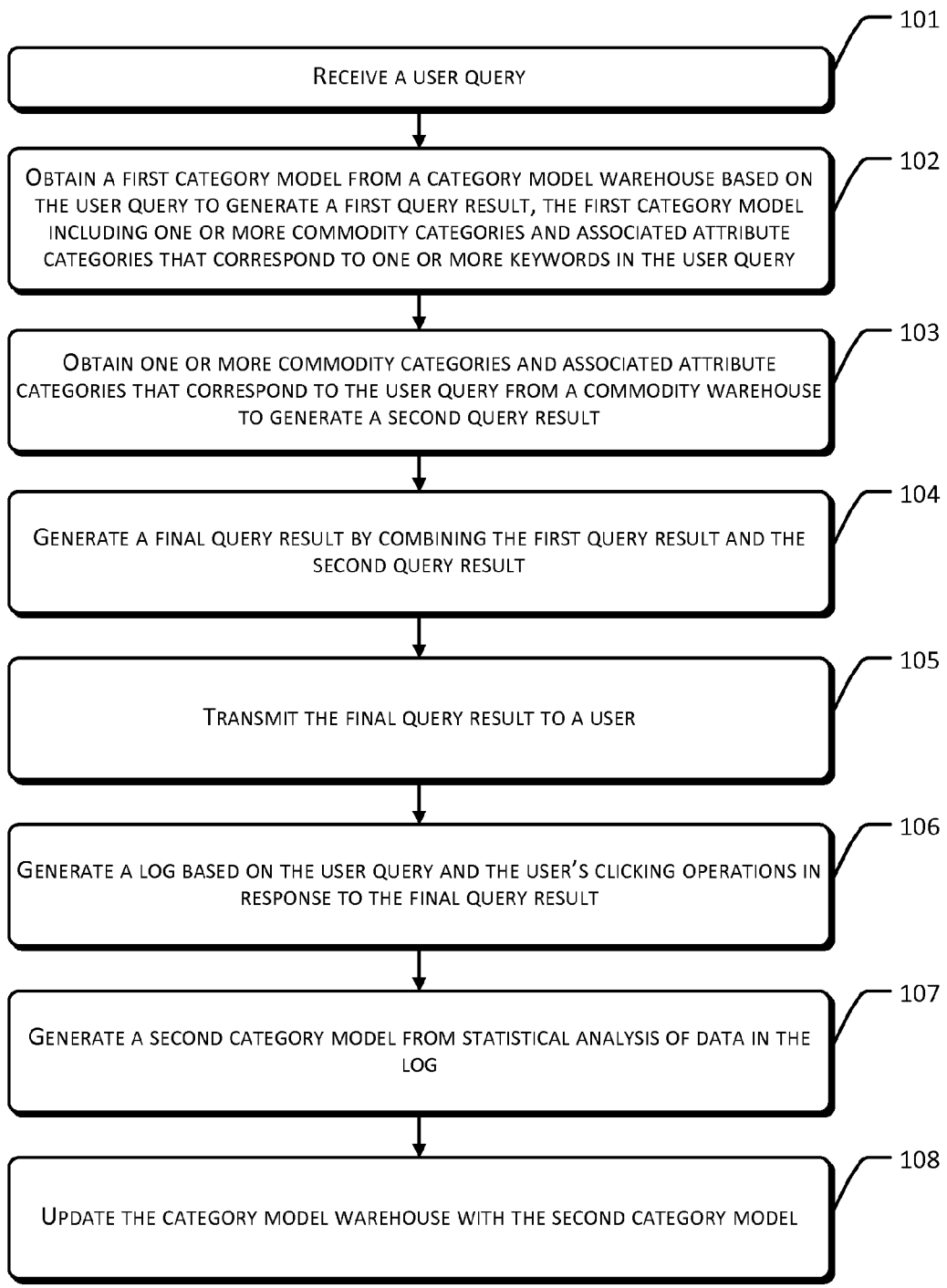
FIG. 2 shows a flowchart of a method of vertical search query in accordance with one embodiment of the present disclosure.

A method of vertical search query in accordance with an embodiment of the present disclosure is shown in FIG. 2. The method comprises a number of operations as described below.

At 101, the method receives a user query from a user.

The user query comprises one or more keywords inputted by the user, commodity category, and one or more commodity attributes as inputted or selected by the user from a query system. The commodity category refers to the classification of different types of commodities. A classification name such as, for instance, "clothing", "mobile phone", is used for navigation through the available commodities. Moreover, there are levels of commodity categories as well as vertical relationship between the categories. For instance, consider "clothing"→"men's apparel"→"men's jeans", where "men's jean" is a child-category of "men's apparel", and "clothing" is the parent-category of "men's apparel." Each commodity may have one or more attributes and can be classified into one or more categories. For instance, certain men's jeans of a given brand may be classified as commodity category "men's apparel" while it may also be classified as "leisure clothing", with "trademark: apple/style: straight cylinder" as the attributes. Another way of commodity classification similar is to classify the commodities based on commodity attributes such as, for instance, "brand→domestic".

For instance, if the keyword inputted by the user is "Nokia", and no selection of the commodity category or the commodity attribute of the query system is made, the user query and the keyword inputted by the user is "Nokia". However, if there is a selection such as "mobile phone", then the user query is "Nokia mobile phone".

At 102, the user query is then matched with the category model from a category model warehouse. The category model comprises the commodity category corresponding to the keyword the user inputted. The first query result is generated using the retrieved category model.

According to different user query, there are two possible scenarios as described below.

In the first scenario, the user query merely comprises the keyword inputted by the user. The user query is retrieved and matched with the category model from the category model warehouse and its associated attribute category to generate the first query result. A corresponding process may comprise the following operations.

1. Determine whether the category model and the user query keyword correspond to each other.

2. If yes, then based on one or more keywords in the user query, the category model is retrieved from the category model warehouse. Otherwise, the one or more keywords in the user query are revised until a matching category model is found.

3. The obtained category model acquires the peak value category. Based on this peak value category, the attribute of the attribute category is obtained. The peak category can prominently reflect the query intent of the user and requested commodity category at its highest weight. For instance, with the user's historical clicking frequency or the highest clicking probability of the commodity category, the target attribute is the attribute category extracted from the multiple commodity attributes of the peak value category. The process uses a method similar to the one for obtaining commodity category goals from the query result and need not be further expounded.

For instance, when the keyword in the user query is merely "Nokia", the matching category models are "mobile phone" (4000) and "mobile phone case" (2000). In this example, 4000 is the corresponding weight of "mobile phone" and 2000 is the corresponding weight of "mobile phone case". If the weight threshold is 500, then the peak value category is "mobile phone". Following a similar process, from the multiple attributes of the "mobile phone" category the attribute category of the target attribute is extracted. For example, the attribute "brand name" obtains the "brand name" attribute category.

If nothing fully meets the conditions for the peak value category, then the commodity category with the highest weight can serve as the peak value category or non-peak category. There is no need to obtain the attribute category of the target attribute from a single commodity category. This specific setup condition does not influence the scope of the present embodiment. For instance, when there are two commodity categories with the highest weights, the attribute category of the target attribute may take half of each.

4. Based on the obtained category model and the attribute category as well as their corresponding weights, the first user query is generated.

Specifically, the commodity categories arranged in descending weights generates a set of commodity categories of the first query result. Simultaneously, the attribute categories arranged in accordance with the descending order of their weights generates a set of attribute categories of the first query result. The commodity categories and attribute categories of the first query result are provided to the user. Preferably, the attribute categories are classified under the different attributes.

Based on the third operation above, the first query result includes: mobile phone (4000) and mobile phone case (2000), and such result is used to generate the attribute category. The results under the attribute of "brand name" include: local brand name (2000) and western brand name (1000). The results under the attribute of "network system" include: GSM (1000) and CDMA (500).

In the second scenario, the user query comprises the keyword inputted by the user as well as commodity category selected by the user. The user query is matched with the category models from the category model warehouse. The first query result is generated using the retrieved category model. A corresponding process may comprise the following operations.

1. Determine whether the category model and the user query keyword correspond to each other.

2. If so, then based on the user query keyword, the category model located in the category model warehouse is retrieved. Otherwise, the user query keyword is revised until a matching category model is found.

3. The obtained category model should correspond to the commodity category of the user query.

4. Aside from corresponding to the category model, the commodity category should also correspond to its weights to generate the first query result.

For instance, as the user query is "Nokia mobile phone", since "mobile phone" does not have a commodity sub-category, the first query result is merely a set of attribute categories. For the attribute of "brand name", the attribute categories include: local brand name (2000) and foreign brand name (1000). For the attribute of "network system", the results include: GSM (1000) and CDMA (500).

It should be noted that if the commodity category "mobile phone" does not have a sub-category, this level of category can be used as the set of commodity categories for the first query results, for instance as in mobile phone (4000) and mobile phone case (2000).

At 103, the method searches the commodity warehouse for the commodity category that matches the user query. This generates the second query result.

The procedure is similar to the currently existing technology. Within the commodity warehouse in accordance with the commodity tree, the method looks for the matching commodity category and its associated attribute category to generate both sets of commodity and attribute categories.

It should be noted that the commodity category model of the first query result is generated based on the user's historical hits in the query result. Thus, the order of the weights corresponds to the clicking frequency or probability. Moreover, the commodity category model of the second query result is based on the classification and organization of the commodity itself Thus, the order standard of the weights corresponds to the commodity category or the commodity attribute distributed among the entire commodity.

For instance, the commodity categories generated by the second query result include: mobile phone (4000) and mobile phone chain (2000). Here, 4000 is the corresponding weight of the commodity category "mobile phone", and 2000 is the corresponding weight of the commodity category "mobile phone chain". The set of attribute categories generated by the second query result with the attribute being "brand name" include: local brand name (2000) and foreign brand name (500).

At 104, the final query result is generated by merging the first and second results.

Specifically, the first query result and the second query result are distinguished from the set of commodity categories and the associated attribute categories. The first and second query results are combined to generate the set of commodity categories and the associated attribute categories for the final query result. This process includes operations as described below.

(1) Obtain the first combiner result. The first combiner result is the merging of the first and second query results which have corresponding commodity categories and attribute categories with their respective weights. The weight of the first combiner is obtained by adding the weights of the two query results having identical commodity categories or attribute categories.

The weights can be added in a 1 to 1 ratio or a 2 to 1 ratio, for example, depending on the actual circumstances.

(2) Obtain the second combiner result. The second combined result comprises those commodity categories, their weights, the associated attribute categories, and their weights that only show up in the second query result.

(3) Each weight of the first combiner result is increased to make it greater than the corresponding weight of the second combiner result. If every weight of the first combiner result is already greater than every weight of the second combiner result, then there is no need to increase the weight of the first combiner result.

(4) The commodity are ranked and returned to the user in a descending order according to the weights of the commodity categories and the weights of the associated attribute categories.

In the above example the first query result includes: mobile phone (4000) and mobile phone case (2000); and the classifications under the attribute of "brand name" include: local brand name (2000) and foreign brand name (1000). The resulting second query result includes: mobile phone (4000) and mobile phone chain (2000); and the classifications under the attribute of "brand name" include: local brand name (2000) and foreign brand name (500).

The two query results are then combined to provide the first combined result. Specifically, for the same commodity category "mobile phone", the weight of the first query result is 4000 and the weight of the second query result is 4000. With weighting factors of 2:1, the combined weight of the commodity category "mobile phone" is now 12000. Similarly, the resulting weights for the classifications under the attribute of "brand name" are 6000 for local brand name and 2500 for foreign brand name. For the commodity that shows up only in the first query result, "mobile phone case" (2000), the weighting factor of 2 is applied to result in a new weight of 4000 as the second combined result.

Preferably, one or more of the commodity from the above combined results are extracted to be part of the final query result to be returned to the user. For instance, the commodity with the most number of hits/clicks in the highest-ranked commodity category, and its detailed information, can be extracted to be part of the final query result.

At 105, the final query result is sent back to the user for viewing.

At 106, a log is generated based on user clicking operations with respect to the final query result and associated user query.

In one embodiment, the log is generated to include the commodity categories, the associated attribute categories and the commodity clicked on by the user for viewing. In other words, the log is generated based on the user's clicking operation. The log comprises user query and corresponding clicking information. The clicking-related information can include the commodity category and the commodity attribute of the commodity clicked on by the user, the clicked commodity and the clicked attribute. The log thus generated is stored.

For instance, with the final query result where the user query is "Nokia", the clicking by a user may be in the order of click result "mobile phone→ Nokia→ 16 million colors", and the user may then choose a particular mobile phone to view. At this point, the user's every click operation is recorded in the log. Information recorded in the log may include: user query, click target, related click target (for example, "mobile phone" and "16 million colors" are related click targets), and so on.

At 107, statistical analysis is carried out on information recorded in the log is analyzed to obtain the category model.

In one embodiment, the user query and its corresponding clicking information are statistically analyzed to provide a statistical analysis result. The statistical analysis result includes the commodity category/categories, the associated weight/weights, the attribute categories corresponding to the commodity category/categories and the associated weights that correspond to the user query. Here, "weight" refers to the click frequency and/or click probability of the commodity categories and the associated attribute categories.

A category model can be generated based on the statistical analysis result. That is, the category model can be arranged according to a commodity category tree based on the statistical analysis result.

In one embodiment, a determination is made as to whether the commodity category/categories, associated weight/weights of the commodity category/categories, attribute categories corresponding to the commodity category/categories, and the associated weights of the attribute categories corresponding to the commodity category/categories, and the associated weights that correspond to the user query have reached certain weight thresholds.

When the thresholds have been reached, the category model is established based on the commodity category/categories, the weight/weights, the associated attribute category/categories and the weight/weights that correspond to the user query.

For instance, the log may be statistically analyzed daily. The user query may be "Nokia", the commodity category "mobile phone" may have 1000 hits, "mobile phone case" may have 500 hits, and the network system under the "mobile phone" category may have 300 hits. Among which, "GSM" has 100 hits and "CDMA" has 50 hits. The resultant category model may include: commodity category: mobile phone (1000) mobile phone case (500); attribute category: GSM (100) CDMA (50).

At 108, a category model warehouse is updated to include the obtained category model.

The category model warehouse is continuously updated through the user's historical clicking record. The continuous maintenance of the precision of the category model warehouse improves the accuracy of the returned query results.

Of course, data from earlier time may be eliminated.

It should be noted that operations 102 and 103 can be executed in no particular time sequence.

Figure 3:
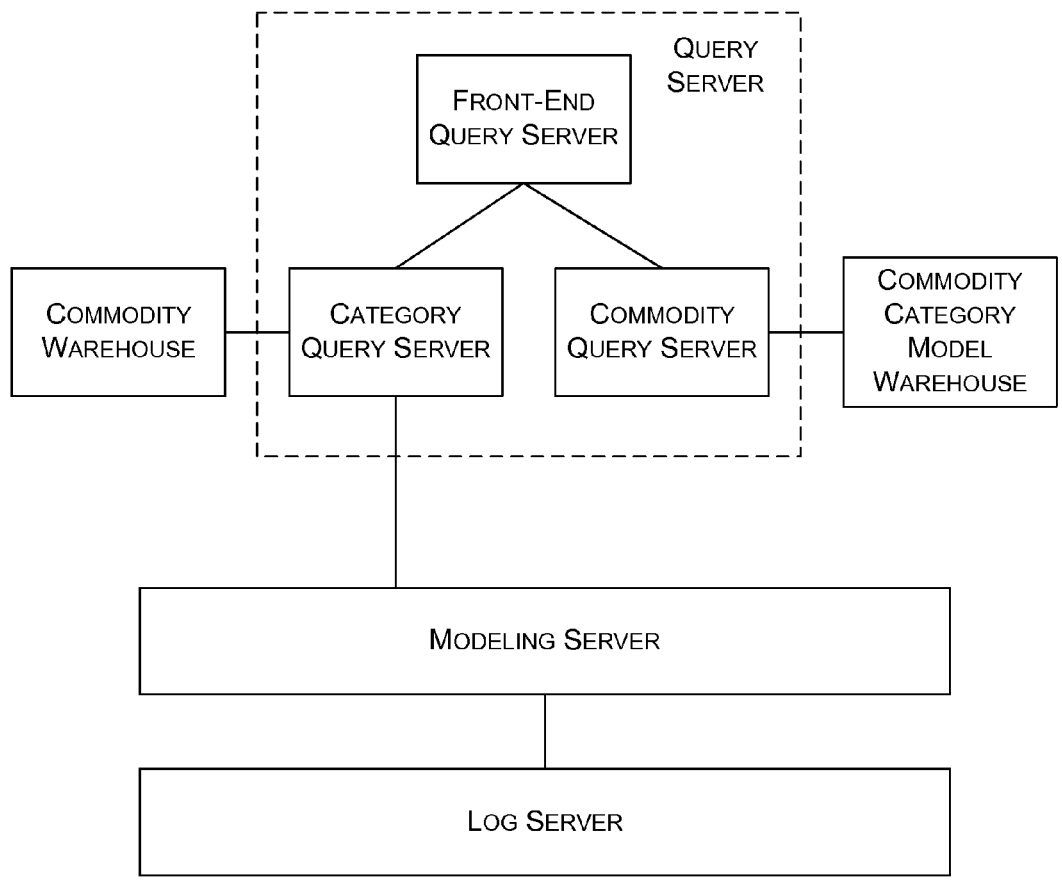
FIG. 3 shows a block diagram of a vertical search query system in accordance with one embodiment of the present disclosure.

To achieve the aforementioned method of vertical search query, an embodiment provides a vertical search query system. As shown in FIG. 3, the system comprises: a log server, a modeling server, a query server, a commodity warehouse, and a commodity category model warehouse. The query server comprises: a front-end query server, a category query server, and a commodity query server. The commodity category model warehouse is stored in the category query server, while the commodity warehouse is stored in the commodity query server. The front-end query server, which is the interface between the user and the back-end, receives query requests from the user and provides query results from the back-end to the user. On the other hand, the category query server and commodity query server are used to transmit query requests from the front-end query server to the commodity warehouse and commodity category model warehouse. Within the commodity category model warehouse, the category model is generated by the established model server based on the log records in the log server.

Detailed description of the various components of the system is provided below.

Figure 4:
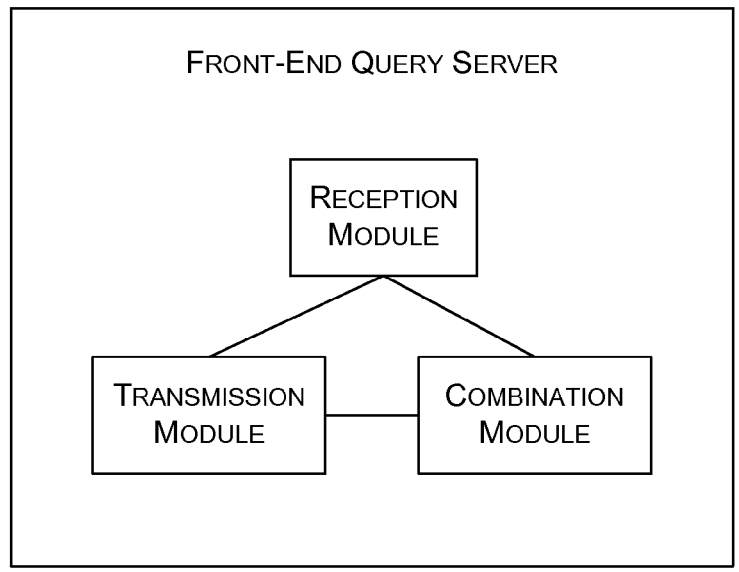
FIG. 4 shows a block diagram of a front-end query server in accordance with one embodiment of the present disclosure.

As shown in FIG. 4, the front-end query server comprises: a reception module, a combination module, and a transmission module. The reception module receives a user request and provides a final query result from the category query server and commodity query server to the user. The combination module combines the query results of the category query server and commodity query server to generate the final query result. The transmitting module transmits the user request to the category query server and commodity query server and returns the query results.

Figure 5:
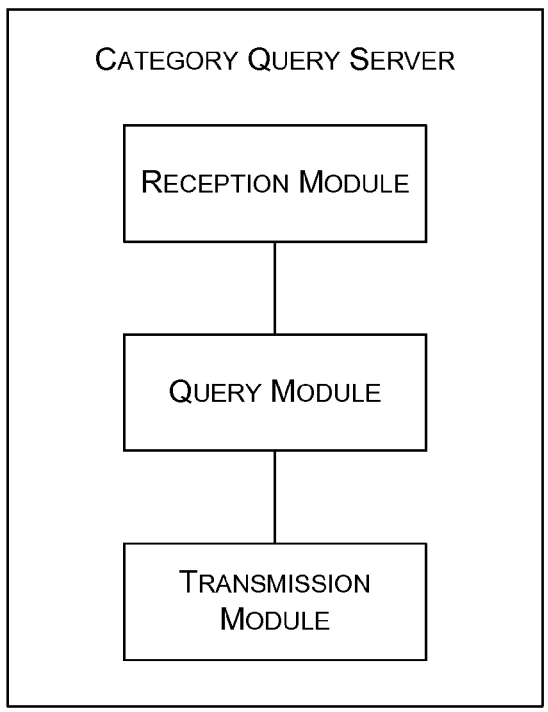
FIG. 5 shows a block diagram of a categorical query server in accordance with one embodiment of the present disclosure.

As shown in FIG. 5, the category query server comprises: a reception module, a query module, and a transmission module. The reception module receives the query request, which carries user query, from the front-end query server. The query module, based on the user query, searches the category model warehouse for one or more commodity categories and weights, and the associated one or more attribute categories and the weights, that correspond to the user query. The transmitting module transmits the query result to the front-end query server.

Figure 6:
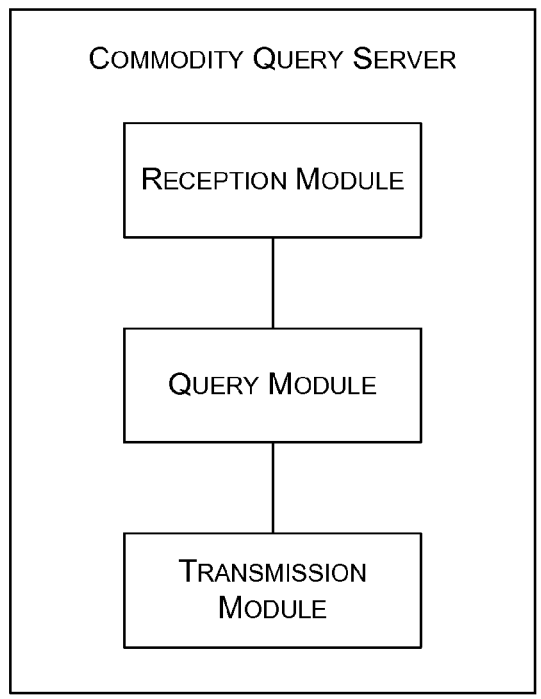
FIG. 6 shows a block diagram of a commodity query server in accordance with one embodiment of the present disclosure.

As shown in FIG. 6, the commodity query server comprises: a reception module, a query module, and a transmission module. The reception module receives the query request, including the user query, from the front-end query server. The query module, based on the user query, searches the category model warehouse for one or more commodity categories and weights, and the associated one or more attribute categories and the weights, that correspond to the user query. The transmitting module transmits the query result to the front-end query server.

Figure 7:
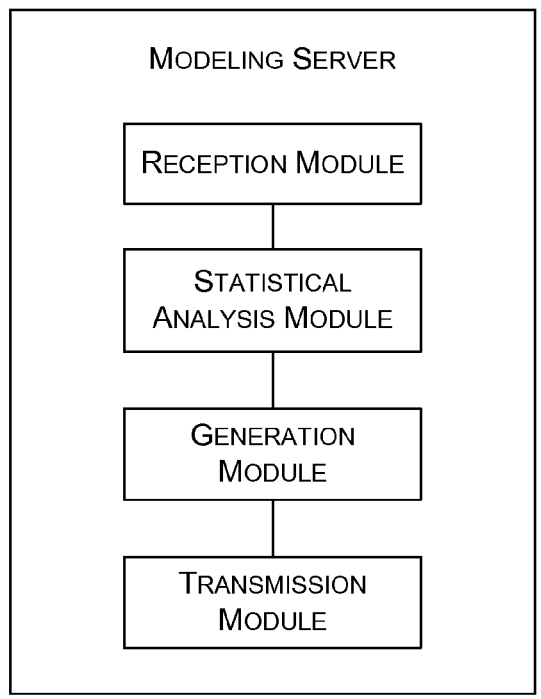
FIG. 7 shows a block diagram of a model building server in accordance with one embodiment of the present disclosure.

As shown in FIG. 7, the established model server comprises: a reception module, a statistical analysis module, a generation module, and a transmission module. The reception module receives the log record generated by the log server. The statistical analysis module statistically analyzes the log record, based on the user query and the corresponding hit/clicking information within the log record, to obtain the statistical analysis result. The statistical analysis results include the category model warehouse for one or more commodity categories and weights, and the associated one or more attribute categories and the weights, that correspond to the user query. The weights refer to the hit/click frequency and/or hit/click probability of the commodity category and attribute category, respectively. The generation module generates the category model based on the statistical analysis result, and arranges the statistical analysis result in accordance with the commodity category tree. Transmitting module transmits the generated category model to the commodity category model warehouse.

The interaction between the various servers described above includes the following two stages: (1) query stage and (2) update stage.

In the query stage, the front-end query server receives a user query request that contains the user query. The front-end query server then transmits the query request to the category query server and commodity query server. Based on the user query, the category query server searches the category model warehouse for one or more commodity categories and/or one or more attribute categories corresponding to the user query, to generate the first query result. The category query server then transmits the first query result to the front-end query server. Based on the user query, the commodity query server searches the commodity warehouse for one or more commodity categories and/or one or more attribute categories corresponding to the user query to generate the second query result. The commodity query server then transmits the second query result to the front-end query server. The front-end query server then combines the two query results to generate the final query result and provides it to the user for viewing.

In the update stage, when the user views the final query result, the front-end query server transmits the user's clicking operation to the log server to generate a log based on the clicking operation. The log server transmits a batch log from a given period of time to the established model server which statistically analyzes the log to obtain the statistical analysis result and generate the category model based on the statistical analysis result. The category model is then transmitted to the category query server to update the category model warehouse with the received category model. With regards to the commodity warehouse of the commodity query server, the categories and attributes are also maintained and updated.

From the above, it can be seen that the query stage and the update stage are part of a cycle. The query result is updated based on the clicking operation by the user, and future queries are conducted based on the updated data. There is continuous updating to increase the relevancy of queries.

Below are specific scenarios of a detailed method based on a vertical search query system of the present disclosure.

Figure 8:
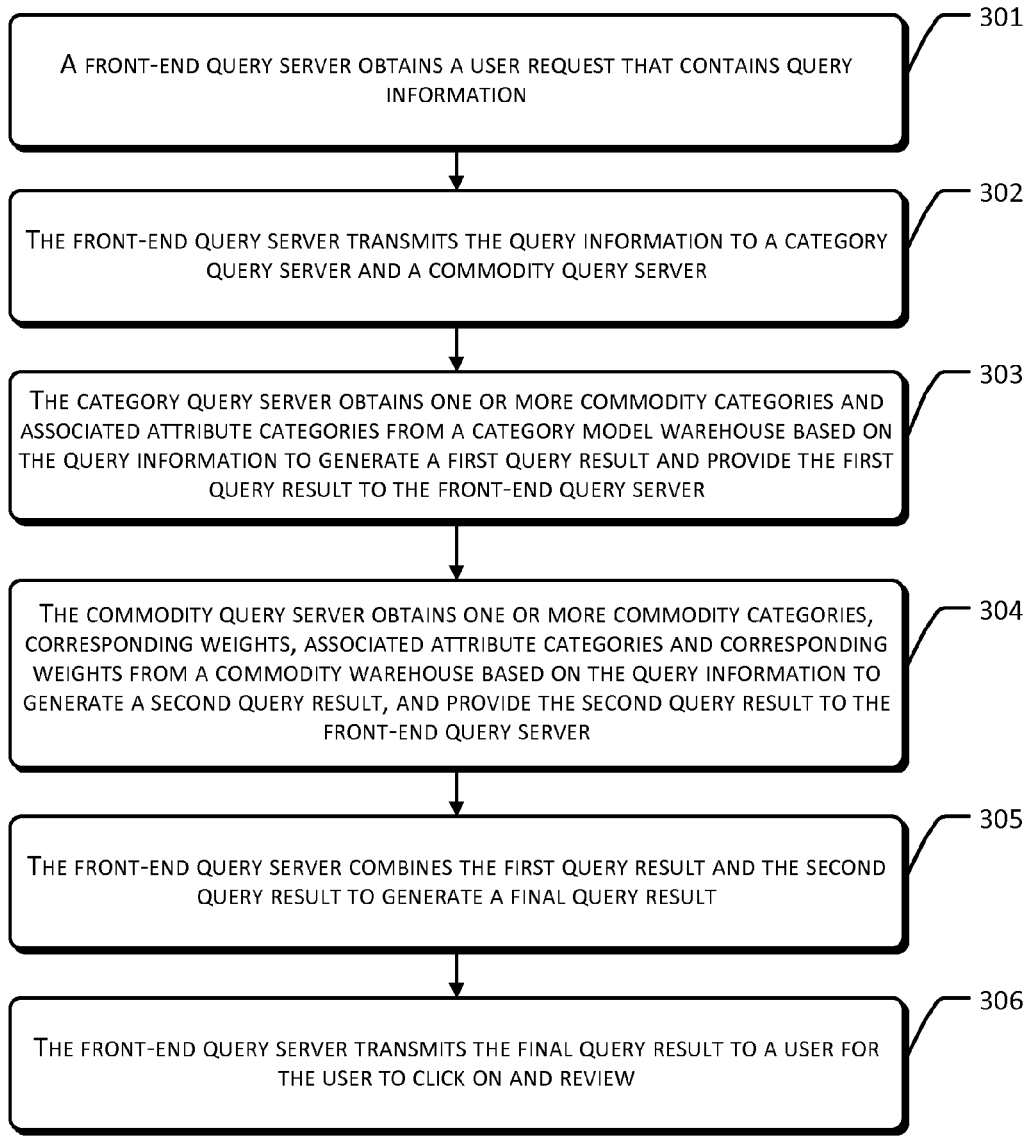
FIG. 8 shows a flowchart of a method of a vertical search query in accordance with another embodiment of the present disclosure.

FIG. 8 shows a method based on a vertical query system of the present disclosure. The query process based on the query request at the category model warehouse and commodity warehouse is described below.

At 301, the front-end query server obtains a user query request which contains the user query.

The front-end query server analyzes the query request to obtain the user query. The analysis process determines whether the query request is a keyword entered by a user through an input box or a commodity category or attribute category selected by the user from a number of commodity categories or attribute categories provided by a search system. Accordingly, the user query in the query request can either be a query keyword inputted by the user or a combination of a query keyword inputted by the user and a selected commodity category or attribute category.

For instance, assuming the query request contains "Nokia mobile phone sliding cover", the front-end query server extracts "Nokia", "mobile phone" and "sliding cover" from the query request and analyzes the sources of these three pieces of user query. If "Nokia" is a keyword inputted by the user, "mobile phone" is the commodity category and "sliding cover" is the attribute category selected by the user, then the query request is a combination of a user-inputted keyword and a user-selected commodity category or attribute category.

At 302, the front-end query server forwards the received user query to the category query server and commodity query server.

At 303, based on the user query, the category query server searches the category model warehouse for commodity category/categories matching the user query as well as the associated attribute category/categories to provide the first query result, and return the first query result to the front-end query server.

The category model warehouse contains a large volume of category models. Every category model includes a number of commodity categories, their respective weights, and the associated attribute categories and their respective weights, and each of the above is correlated to one or more respective keywords. The commodity categories and their weights form commodity category sets based on the corresponding keywords, with the commodity categories listed according to the respective weights in a descending order. Similarly, the attribute categories and their weights form attribute category sets based on the corresponding keywords, with the attribute categories listed according to the respective weights in a descending order. Notably, in some embodiments, every generated category model is based on the historical clicking data of the corresponding keywords. Further explanation of the generating process will follow.

Preferably, the category model, using keywords as units, is stored and arranged according to the commodity category tree. In other embodiments, the category model may be arranged in any other order. For illustrative purpose, a form of a category model is shown in Table 1 below.

TABLE 1

| Keyword | Commodity Category and Corresponding Weight | Attribute Category | Attribute Category and Corresponding Weight |
|---|---|---|---|

The category model of Table 1 is organized according to the commodity category tree relationships. In other embodiments, the category model can also be organized in a commodity category tree form. In any case, the scope of the present disclosure is not limited to any particular form. Referring to Table 1, there are three relationship layers: commodity categories, a plurality of commodity attribute types corresponding to each commodity category (including one type), and a plurality of attributes corresponding to each commodity attribute type. One example may be as follows: mobile phone (category)—brand name/network system (attribute type)—Nokia/GSM (attribute).

Figure 9:
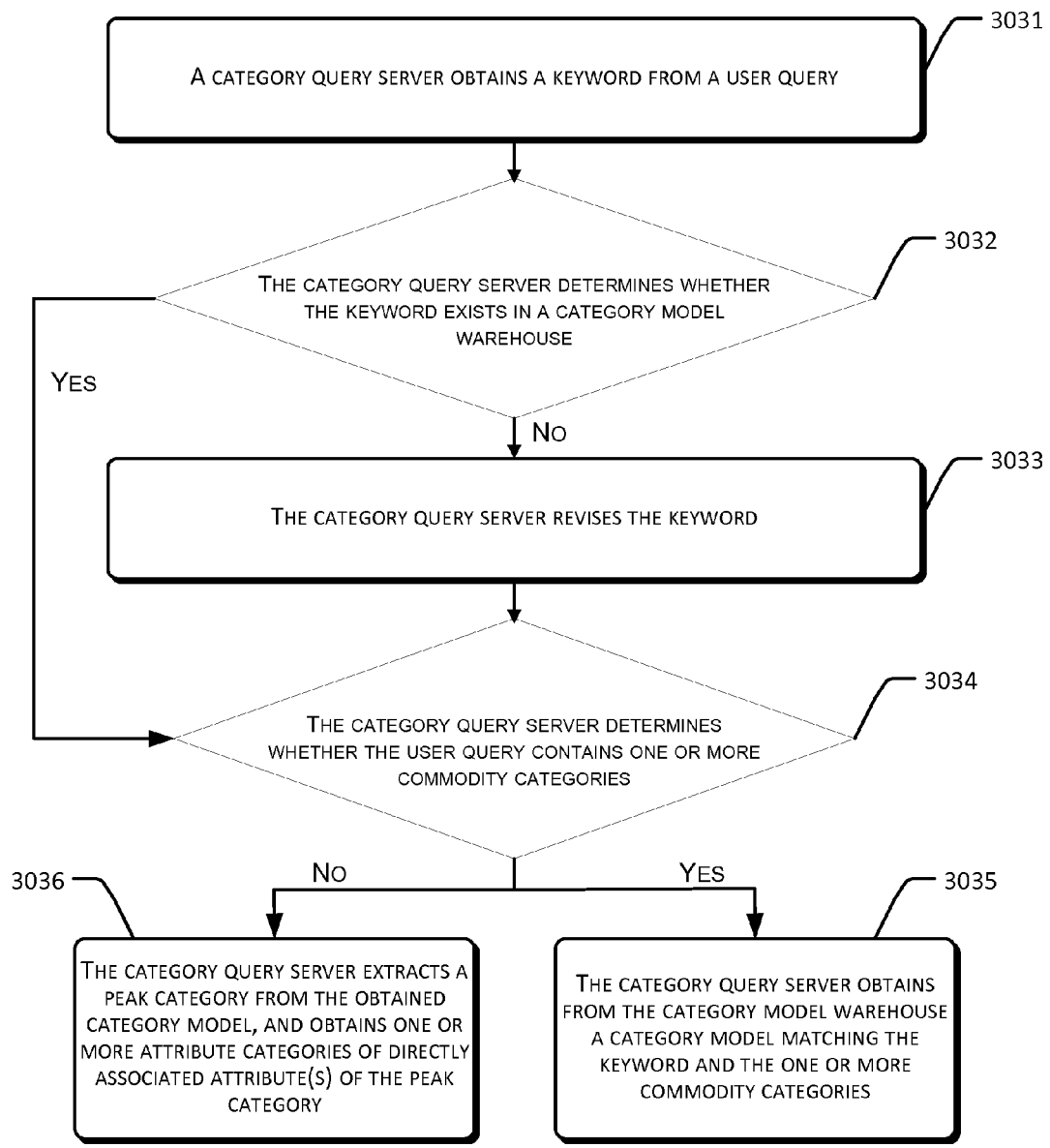
FIG. 9 shows a flowchart of a method in which a categorical query server retrieves a commodity category and its associated attribute category that matches the user query in accordance with one embodiment of the present disclosure.

In one embodiment, based on the user query, the category query server searches in the category model warehouse for the commodity categories and the attribute categories that match the user query. As shown in FIG. 9, this process comprises a number of stages as described below.

At 3031, the category query server extracts a keyword from the user query.

At 3032, the category query server determines whether the keyword is in the category model warehouse.

In one embodiment, determining whether the keyword is in the category model warehouse may comprise either of the following two scenarios:

(1) When the keyword is not in the category model warehouse, the process proceeds to 3033;

(2) When the keyword is in the category model warehouse, the process proceeds to 3034;

At 3033, the category query server revises the keyword.

While retaining the core intent of the keyword, the category query server revises the keyword. First, the user query is parsed and unimportant words/phrases and removed and substituted with synonyms. Second, each resultant word/phrase from the parsing is annotated with a category (e.g., words such as commodity/brand). Third, based on the category annotation, each word/phrase is assigned a corresponding weight according to predetermined rules. Finally, the revised keyword is determined according to the weight of each word/phrase. The process then returns to 3032.

For instance, the user query may be "Nokia mobile phone red." First, the user query is parsed to obtain "Nokia", "mobile phone" and "red." Second, each parsed word/phrase is annotated, such as, "Nokia" as brand name, "mobile phone" as commodity, and "red" as commodity attribute. Third, each parsed word/phrase is assigned a corresponding weight based on predetermined correlations between category annotations and weights. For example, brand name may correlate to a weight of 50, commodity may correlate to a weight of 30, and commodity attribute may correlate to a weight of 2. Therefore, "Nokia" weight is 50, "mobile phone" weight is 30, and "red" weight is 2. Finally, since the weight of "red" is relatively lower, it may be disregarded. Thus, the revised keyword is "Nokia mobile phone."

At 3034, of the category query server determines whether the query information indicates the commodity category.

In one embodiment, determining whether the user query indicates the commodity category may comprise either of the following two scenarios:

(1) When the query information indicates the commodity category, the process proceeds to 3035.
(2) When the query information does not indicate the commodity category, the process proceeds to 3036.

For instance, when the user query is merely the user-entered keyword "Nokia", it may be determined that the user query does not specify the commodity category. When the user query keyword is the user-entered keyword "Nokia" and the user selects the commodity "mobile phone" among the commodity categories provided by the query system, it may be determined that the user query does specify the particular commodity category.

At 3035, based on the keyword and the specified commodity category, the category query server searches the warehouse to obtain the matching category model. The process then proceeds to 304.

(1) Based on the keyword, the category query server searches the category model warehouse to obtain the category model tree corresponding to the keyword.
(2) Based on the specified commodity category, a category model corresponding to the specified commodity category is obtained from the category model tree. A first query result is generated according to the commodity categories, their corresponding weights, attribute categories corresponding to the commodity categories, and their corresponding weights in the category model, including the resultant commodity category set and attribute category set. That is, all the commodity category branches of the category tree model are selected, and a tree structure of a category model with the commodity category being the parent node is obtained.

For example, when the user query is "Nokia mobile phone", from the level of "mobile phone" and "mobile phone casing", "mobile phone" may be selected and a corresponding category model tree structure may be obtained.

At 3036, the category query server extracts the peak category from the obtained corresponding category model, and obtains the attribute category of the attribute corresponding to the peak category.

In one embodiment, extracting the peak category from the obtained corresponding category model by the category query server may comprise a number of stages as described below.

(1) Ranking the commodity categories in the category model according to their weights in a descending order, from the highest weight to the lowest weight.
(2) Obtaining the first-ranked commodity category in the rank.
(3) Determining whether the weight of the first-ranked commodity category is greater than a weight threshold a.

When the weight of the first-ranked commodity category is greater than a threshold weight a, the process proceeds to stage (4). Preferably, the weight threshold a may be set based on historical data of the frequency at which commodity categories in query results are clicked by users. For example, when a commodity category's historical click rate is greater than 50%, the weight of this commodity category is set as the weight threshold a.

(4) Determining whether the difference between the weight of the first-ranked commodity category and the weight of the second-ranked commodity category is greater than a weight threshold b.

When the difference between the weight of the first-ranked commodity category and the weight of the second-ranked commodity category is greater than a weight threshold b, it shows that based on the historical data the first-ranked commodity category has higher user clicking frequency and hence this commodity category may be given priority in presenting to users. That is, the attribute categories of this commodity category may be presented to users to thereby increase the frequency of queries by users. The process then proceeds to (5).

(5) The first-ranked commodity category may be set to be the peak category. Based on this peak category, the one or more corresponding direct attributes of the associated attribute category may be obtained. The one or more attribute categories of the direct attributes are sent to the user as the query result.

For example, when the user query is "Nokia," the category model tree structure with "mobile phone" and "mobile phone casing" as the parent nodes is presented to the user. When "mobile phone" is the peak category, the direct attribute "network system" of the attribute category corresponding to "mobile phone" may be chosen. Subsequently, "GSM" and "CDMA", both categories by "network system", are sent to the user.

The examples described in the present disclosure may be directed to a scenario where the first-ranked commodity category is the peak category. It is appreciated that in other embodiments the peak category may comprise other high ranking commodity categories.

In one embodiment, attribute categories of the one or more direct attribute of the peak category may be obtained, and the attribute categories may be arranged or ranked in a descending order according to their respective weights. Those attribute categories with weights lower than a preset value may be filtered out. Those attribute categories with weights higher than the pre-set value may be set as the attribute categories to be sent to the user.

It is noteworthy that the arrangement of the attribute categories in a certain order and the sending of the attribute categories to the user may be similar to that for commodity categories, with ranking based on weights. As attribute categories attach to commodity categories, the commodity categories are ranked and sent to the user first and then similarly for the attribute categories under each commodity category.

Here, the query result may comprise the attribute categories of the direct attribute of the commodity category in the category model that matches the keyword.

At 304, the commodity query server searches for the commodity categories, their weights, the associated attribute categories and their weights matching the user query. The commodity query server then generates a second query result and sends it back to the front-end query server.

For example, the second query result may comprise commodity categories including: mobile phone (4000), mobile phone chain (2000). The second query result may also comprise attribute categories that include categories based on "brand": local brand (2000), Western brand (500).

At 305, the front-end query server combines the first query result and the second query result to generate a final query result. Some possible scenarios are discussed below.

Scenario 1: The commodity categories and the associated attribute categories that are present in both the first and second query results have historically high user-click frequencies, meaning they attract much user attention and may be well distributed in the commodity warehouse. In this case, the weights of the commodity categories and the associated attribute categories are superimposed. In one embodiment, the values of the two query results are weighted and superimposed to generate each commodity category, its weight, the associated attribute category and its weight for the final query result. Furthermore, the commodity categories and attribute categories are arranged in a descending order according to their weights to generate the first combined result.

Scenario 2: With respect to commodity categories and the associated attribute categories that are only present in the second query result, the commodity categories may be well distributed in the commodity warehouse but not necessarily receiving much user attention. The commodity categories, their weights, the attribute categories and their weights in the second query result are arranged in a descending order according to the weights to generate the second combined result.

Scenario 3: With respect to the commodity categories and the associated attribute categories that are only present in the first query result, there may be no match of the commodity categories in the commodity warehouse (or that the probability of a match is low). Accordingly, such categories are not included in the final query result.

(6) Determining the arrangement of the commodity categories in the final query result.

The respective weights of the first combined result's commodity categories and attribute categories are increased following a preset guideline. Every weight in the commodity category set and the attribute category set of the first combined result is increased to be higher than every weight in the second combined result. Afterwards, all the commodity categories and the associated attribute categories are arranged in a descending order according to the weights.

For instance, weights of the first combined result may be as follows: commodity category a: 120, commodity category b: 100 and commodity category c: 80. Weights of the second combined result may be as follows: commodity category i: 110, commodity category j: 90 and commodity category k: 70. If there is no increase, then an arrangement in descending order may be as follows: commodity category a-commodity category i-commodity category b-commodity category j-commodity category c-commodity category k. If the guideline for increasing weights stipulates that the increased weight is two times the original weight, then the weights of the first combined result may be as follows: commodity category a: 240, commodity category b: 200 and commodity category c: 160. An arrangement in descending order may be as follows: commodity category a-commodity category b-commodity category c-commodity category i-commodity category j-commodity category k.

At 306, the front-end query server sends the final query result to the user for the user's clicking and viewing.

It is noteworthy that stages 303 and 304 described above need not occur in the order presented and may occur in a different order.

The weight increase above is a preferred implementation in the present disclosure. The weight increase, however, is not limited to the process of combining the query results but may also be used in the query process based on the user query, or any other process that may include arrangement based on the weights such as, for example, the establishment of a category model. The present embodiment may also be used when providing to the user only one or more commodity categories without providing attribute categories.

Figure 10:
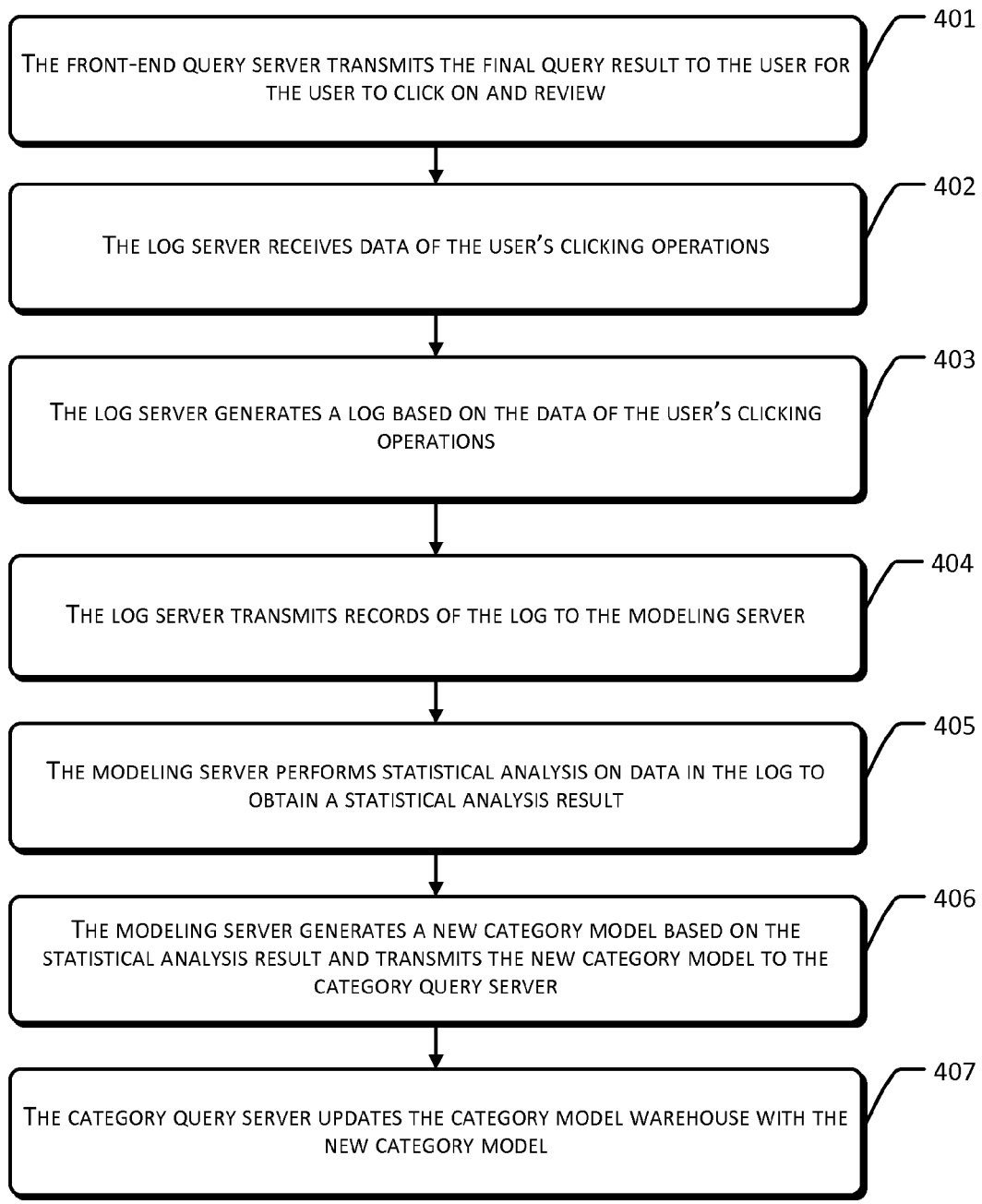
FIG. 10 shows a flowchart of a method for a type of vertical search query in accordance with one embodiment of the present disclosure.

As shown in FIG. 10, a method of query by vertical search is provided.

Based on user history of clicking and viewing with respect to commodities, the category model warehouse and commodity warehouse used for query are updated (update the period). In one embodiment, the implementation includes a number of stages described below.

At 401, the front-end query server sends the final query result to the user for the user to click on and view.

After the front-end query server receives query results respectively from the category query server and the commodity query server, it combines the two query results to generate the final query result and sends the final query result to the user.

For example, given the user query of "Nokia," the commodity categories in the query result may be: mobile phone (4000); mobile phone casing (2000). The associated attribute category may be brand, which may include local brand (2000) and Western brand (1000).

At 402, the log server receives information related to the clicking operation by the user.

When the user selects, from the final query result, a commodity category, an attribute category or a commodity by clicking on the selected item, the log server in the backend will record the user's clicking operation.

Information related to the user clicking operation may indicate the commodity category, attribute category or the commodity clicked on by the user, as well as the user query corresponding to the particular query. For instance, the information may indicate that the user selected the commodity category of "mobile phone" by clicking on the commodity category "mobile phone," by directly clicking on the attribute category of local brand, or by clicking on any concrete commodity information such as a black Nokia N97.

In one query, the user may click on multiple commodity categories, attribute categories or commodities. Accordingly, the log server can process the information by treating the items that have been clicked on as a set of data for processing.

At 403, the log server generates a log based on the user clicking operations. For example, the log server generates a text file based on the user clicking operations on a browser.

At 404, the log server sends the logs in batches to the modeling server.

The log server may send the logs in batches to the modeling server, such as, upon a preset periodicity (such as daily), receiving a request or achieving a preset criterion (such as when the amount of logs for processing by the modeling server reaches certain threshold). In any event, all methods that trigger the log server to send logs to the modeling server are within the scope of the present disclosure.

At 405, the modeling server conducts statistical analysis on the batch data to obtain statistical results.

The log records may comprise any of the following scenarios:

(1) The log record may be generated based on the user clicking on a specific commodity.

(2) The log record may be generated based on the user clicking on a commodity category.

(3) The log record may be generated based on the user clicking on an attribute category.

The log records may be statistically analyzed on a daily basis. In one embodiment, the statistical analysis may comprise two stages as described below.

(1) Processing the new daily logs for all users that are in the received data.

In one embodiment, user logs from each day are extracted for statistically analysis based on various keywords, and formatted data based on arrangements of keywords are obtained. Statistically analysis based on various keywords may comprise: under a query based on a given keyword, counting the commodity and its corresponding commodity attributes clicked on based on the given keyword, as well as the commodity category and attribute category clicked on based on the given keywords.

For example, considering the keyword "Nokia," the number of user clicks on the commodity category "mobile phone" may be 1,000, the number of user clicks on the attribute category "network system" may be 300, and the number of user clicks on the sub-category "GSM" may be 100. Under the mobile phone category and of the GSM network system, the number of user clicks on the black Nokia N97 may be 50 and the number of user clicks on the attribute category may also be 50. For those clicking records with causal relation, the number of clicks on the resultant event is converted to the count of clicks on the causal event. For example, clicks on the attribute "GSM" of the commodity black Nokia N97 are converted to the count for the attribute category "GSM," and clicks on the commodity black Nokia N97 are converted to the corresponding commodity category "mobile phone." The ratio of conversion may be based on historical value or actual needs. For instance, the converted counts may be 1,500 for mobile phone, 500 for network system, and 200 for GSM. Data from multiple days may be processed together, with the daily counts corresponding to the keyword "Nokia" accumulated, to organize data according to the tree structure of the commodity category.

The above-mentioned counting method for number of user clicks is a preferred implementation of the present disclosure. All methods that count the number of user clicks based on log records are within the scope of the present disclosure.

(2) Processing the data from multiple days in a period (such as 40 days, for example) including the latest day in the record.

At 406, the modeling server generates a category model based on the statistical analysis and sends the category model to the category query server.

In one embodiment, the modeling server determines whether or not respective weight thresholds have been reached by commodity categories, their weights, attribute categories corresponding to the commodity categories, and their weights which correspond to the user query. When one of the thresholds is reached, the modeling server sets up an organization according to the commodity category tree format to generate the category model, based on the commodity categories, their weights, attribute categories corresponding to the commodity categories, and their weights.

At 407, the category query server updates the category model warehouse with the category model.

This stage may constantly update the category model warehouse with historical user clicking records, and the updated category model warehouse is used to provide query results in subsequent user queries. As the update is continuous the precision of the category model warehouse is maintained to thereby increase the accuracy of the query results.

Figure 11:
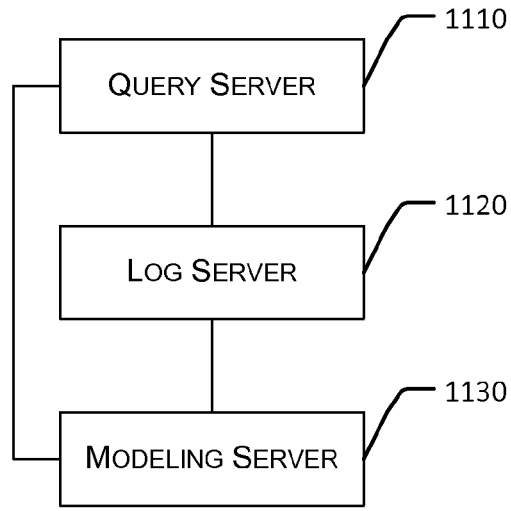
FIG. 11 shows a block diagram of a query system in accordance with one embodiment of the present disclosure.

The present disclosure also provides a query system based on vertical search. As shown in FIG. 11, the query system comprises a query server 1110, a log server 1120, and a modeling server 1130.

The query server 1110 obtains the user query. From this user query, the query server 1110 retrieves a matching category model from the category model warehouse. The category model may comprise one or more commodity categories corresponding to the keyword(s) in the user query. Based on the retrieved category model, a first query result is generated. Furthermore, based on the commodity category matching the user query retrieved from the commodity warehouse, a second query result is generated. The first and second query results are combined to generate a final query result.

The category model may also comprise one or more attribute categories corresponding to the one or more commodity categories.

The query server 1110 may also retrieve from the commodity warehouse one or more commodity categories and the corresponding one or more attribute categories that match the user query.

The log server 1120 generates logs using user clicking operations based on the final query result from the query server 1110 and the user query. The logs are then sent to the modeling server 1130.

In one embodiment, the log server 1120 obtains user clicking operations related to commodity categories, as well as the associated attribute categories and commodities. According to the user clicking operations, the log server 1120 generates one or more logs which may comprise the user query and corresponding user clicking information. The user clicking information may comprise the commodity categories and commodity attributes of the commodities clicked on by the user, the commodity categories clicked on by the user, and the attribute categories clicked on by the user.

The modeling server 1130 statistically analyzes the logs to generate a category model.

In one embodiment, the modeling server 1130, based on the user query and corresponding user clicking information from the log records, statistically analyzes the log records to obtain statistical analysis results. The statistical analysis results may comprise the commodity categories, their weights, the associated attribute categories and their weights that correspond to the user query. The weights may be the number of counts of user clicks and/or user clicking probability on the commodity categories and associated attribute categories. The modeling server 1130 generates the category model using the statistical analysis results, and arranges the statistical analysis results according to the commodity category tree.

In some embodiments, the modeling server 1130 may also determine whether or not the commodity categories, their weights, the associated attribute categories and their weights that correspond to the user query have reached the respective weight thresholds. When a weight threshold is reached, the modeling server 1130 may establish the category model based on the commodity categories, their weights, the associated attribute categories and their weights.

The modeling server 1130 sends the category model to the query server 1110. Correspondingly, the query server 1110 sends the final query result to the user for viewing, and updates the category model warehouse with the category model received from the modeling server 1130.

Figure 12:
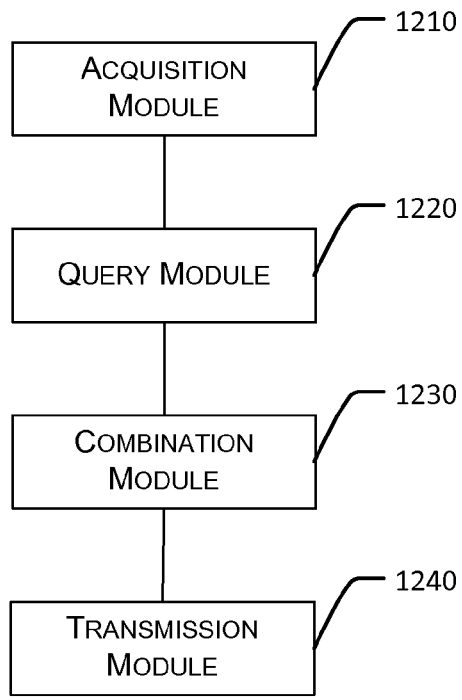
FIG. 12 shows a block diagram of a query server in accordance with another embodiment of the present disclosure.

A query server according to an embodiment of the present application, as illustrated in FIG. 12, may comprise an acquisition module 1210, a query module 1220, and a combination module 1230.

The acquisition module 1210 obtains a user query.

The query module 1220, based on the user query, retrieves the category model matching the user query from the category model warehouse, and generates a first query result based on the category model. The category model may comprise one or more commodity categories corresponding to one or more keywords in the user query. The query module 1220 also searches for commodity categories that match the user query in a commodity warehouse to generate a second search result.

The category model may further comprise attribute categories corresponding to the commodity categories.

The query module 1220 also searches the commodity warehouse for the commodity categories and associated attribute categories that match the user query.

The combination module 1230 combines the first and second query results to generate the final query result.

The query server 1200 may further comprise a transmission module 1240.

The transmission module 1240 transmits the final query result to the user for viewing. The transmission module 1240 causes the log server to generate logs based on user clicking operations in the final query result and send the logs to the modeling server, which in turn conducts statistical analysis to obtain the category model and updates the category model warehouse in the commodity category server with the category model.

Figure 13:
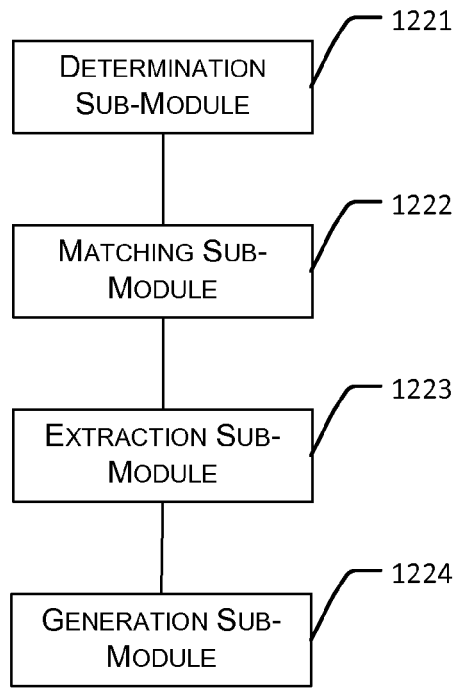
FIG. 13 shows a block diagram of a query module of a query server in accordance with one embodiment of the present disclosure.

When the user query merely comprises one or more keywords inputted by the user, as shown in FIG. 13, the query module 1220 may comprise a determination sub-module 1221, a matching sub-module 1222, an extraction sub-module 1223, and a generation sub-module 1224.

The determination sub-module 1221 determines whether or not the keywords corresponding to the category model include any the one or more keywords in the user query.

The matching sub-module 1222 retrieves from the category model warehouse a category model matching a keyword in the user query, when the determination result by the determination sub-module 1221 is positive. Otherwise, the one or more keywords in the user query will be revised with another determination made, and so on, until a matching category model is found.

The extraction sub-module 1223 obtains the peak category from the category model and obtains attribute categories of the direct attributes corresponding to the peak category.

The generation sub-module 1224 generates the first query result using the commodity model, the corresponding weight, the attribute categories of the direct attributes, and their weights.

When the user query comprises one or more keywords inputted by the user and one or more user-selected commodity categories, the aforementioned sub-modules may perform differently as described below.

The determination sub-module 1221 determines whether or not the one or more keywords corresponding to the category model include any of the one or more keywords in the user query.

The matching sub-module 1222, based on the one or more user-inputted keywords, searches the category model warehouse and obtains matching category model. Otherwise, the matching sub-module 1222 revises the one or more keywords in the user query and determines whether a matching category model is found until a matching category model is found;

The extraction sub-module 1223 obtains, from the category model, the category model that matches the commodity category of the user query.

The generation sub-module 1224 generates the first query result using the commodity categories and the corresponding weights that match the commodity category obtained by the query server.

Figure 14:
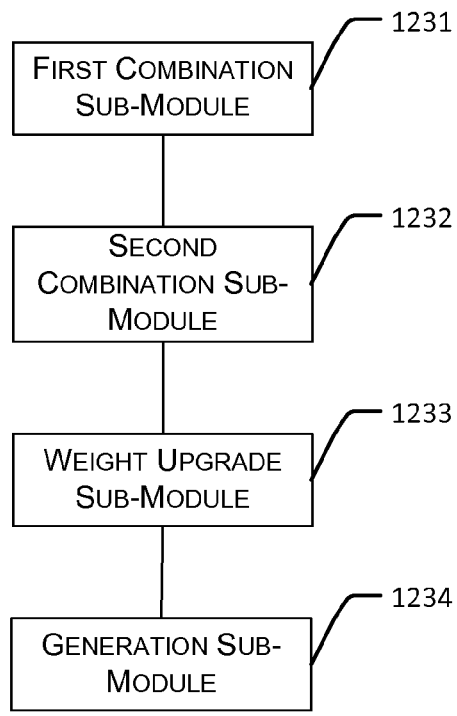
FIG. 14 shows a block diagram of a merging module of the query server in accordance with one embodiment of the present disclosure.

As shown in FIG. 14, in one embodiment the combination module 1230 may comprise a first combination sub-module 1231, a second combination sub-module 1232, a weight upgrade sub-module 1233, and a generation sub-module 1234.

The first combination sub-module 1231 obtains the first combined result. The first combined result comprises identical commodity categories, their weights, the associated attribute categories and their weights from the first and second query results. The weights of the first combined result is obtained by adding the weights of the same commodity category or attribute category from the first and second query results.

The second combination sub-module 1232 obtains the second combined result. The second combined result comprises the commodity categories, their weights, the associated attribute categories and their weights.

The weight upgrade sub-module 1233 increases the weights of the first combined result so that the weight of each of the commodity categories and attribute categories of the first combined result is greater than the weight of each of the commodity categories and attribute categories of the second combined result.

The generation sub-module 1234 arranges the commodity categories and the associated attribute categories according to their weights in a descending order and send to the user.

Embodiments of the present disclosure provide some advantages. For example, by querying category model warehouse and commodity warehouse that are generated based on user clicking operations, and combining the two, user query results and the degree of correlation to user intention can be improved to thereby enhance user experience.

Through the description of above implementations, a person skilled in the art can add any needed software to the disclosed hardware platform to implement the disclosed techniques. Of course, the techniques can also be implemented with hardware, but in many circumstances the implementation of the former would be better. Based on this understanding, the advantage of the disclosed techniques over the existing technology may be realized by way of software implementation. The software, in the form of computer-executable instructions, can be stored in one or more computer-readable storage media and executed in one or more equipment (such as, for example, mobile phone, personal computer, server, network equipment, etc.) to implement the disclosed method.

The present disclosure describes preferred embodiments only. A person of ordinary skill in the art can modify and improve the disclosure without departing from the principle of the present disclosure. Such improvements are also deemed to be within the scope of the disclosure.

The invention claimed is:

1. A method of query based on a vertical search, the method comprising:

receiving a user query;

obtaining a first category model from a category model warehouse based on the user query to generate a first query result, the first category model comprising one or more commodity categories that correspond to one or more keywords in the user query;

obtaining one or more commodity categories corresponding to the user query from a commodity warehouse to generate a second query result; and generating a final query result by combining the first query result and the second query result, wherein generating the final query result comprises:

obtaining a first combined result comprising commodity categories that are in both the first query result and the second query result, the first combined result further comprising weights corresponding to the commodity categories in the first combined result and being a combination of weights from the first query result and from the second query result;

obtaining a second combined result comprising commodity categories and corresponding weights in the second query result;

increasing the weights in the first combined result to render the weights corresponding to the commodity categories in the first combined result to be respectively higher than the weights corresponding to the commodity categories in the second combined result; and arranging the commodity categories in the first combined result according to the weights in the first combined result in a descending order to provide the first combined result to a user.

2. A method as recited in claim 1, further comprising:
transmitting the final query result to a user;
generating a log based on the user query and the user's clicking operations in response to the final query result;
generating a second category model from statistical analysis of data in the log; and
updating the category model warehouse with the second category model.

3. A method as recited in claim 1, wherein the first category model comprises one or more attribute categories corresponding to the one or more commodity categories, and wherein generating the second query result comprises obtaining one or more commodity categories and associated attribute categories that match the user query.

4. A method as recited in claim 1, wherein, when the user query comprises one or more keywords inputted by a user, the obtaining the first category model from the category model warehouse based on the user query to generate the first query result comprises:

determining whether a keyword corresponding to the first category model matches any of the one or more keywords in the user query;

in an event that the keyword corresponding to the first category model matches any of the one or more keywords in the user query:

obtaining a third category model matching a keyword of the one or more keywords in the user query that matches the keyword corresponding to the first category model;

in an event that keywords corresponding to the first category model do not include any of the one or more keywords in the user query:

revising the one or more keywords in the user query and repeating the determining until a fourth category model that matches any of the revised one or more keywords in the user query is obtained; and generating the first query result using the third category model or the fourth category model, one or more corresponding weights, one or more attribute categories of one or more direct attributes, and one or more weights corresponding to the one or more attribute categories.

5. A method as recited in claim 1, wherein, when the user query comprises one or more keywords inputted by a user and one or more commodity categories selected by the user, the obtaining the first category model from the category model warehouse based on the user query to generate the first query result comprises:

determining whether keywords corresponding to the first category model include any of the one or more keywords in the user query;

in an event that a keyword corresponding to the first category model matches any of the one or more keywords in the user query:

obtaining a third category model matching a keyword of the one or more keywords in the user query that matches the keyword corresponding to the first category model;

in an event that the keyword corresponding to the first category model does not match any of the one or more keywords in the user query:

revising the one or more keywords in the user query and repeating the determining until a fourth category model that matches any of the revised one or more keywords in the user query is obtained;

obtaining a fifth category model that matches the one or more commodity categories selected by the user in the user query from the third category model or the fourth category model; and generating the first query result using commodity categories in the fifth category model and corresponding weights thereof.

6. A method as recited in claim 1, wherein
the first combined result further comprises associated attribute categories that are in both the first query result and the second query result, and weights corresponding to the associated attribute categories in the first combined result;
the second combined result further comprises associated attribute categories in the second query result, and weights corresponding to the associated attribute categories in the second query result;
rendering the weights corresponding to the attribute categories in the first combined result to be respectively higher than the weights corresponding to the attribute categories in the second combined result; and
arranging the associated attribute categories in the first combined result according to the weights corresponding to the attribute categories in the first combined result in a descending order to provide the first combined result to the user.

7. A method as recited in claim 2, wherein the generating the log based on the user query and the user's clicking operations in response to the final query result comprises:

obtaining data on the user's clicking operations with respect to a plurality of commodity categories, attribute categories corresponding to the plurality of commodity categories, and commodities in response to the final query result;

generating the log based on the data on the user's clicking operations, the log comprising the user query and clicking information, the clicking information comprising a commodity category and an attribute category of a commodity clicked on by the user, a commodity category clicked on by the user, and a attribute category clicked on by the user; and storing the generated log.

8. A method as recited in claim 2, wherein the generating the second category model from statistical analysis of data in the log comprises:

obtaining a statistical analysis result based on statistical analysis of the user query and corresponding clicking information in the log, the statistical analysis result comprising a plurality of commodity categories, associated attribute categories, and weights corresponding to the plurality of commodity categories and the associated attribute categories that correspond to the user query, the weights corresponding to the plurality of commodity categories and the associated attribute categories comprising number of clicks on the plurality of commodity categories and the associated attribute categories, clicking probability related to the plurality of commodity categories and the associated attribute categories, or a combination thereof; and arranging the statistical analysis result as a category tree to generate the second category model.

9. A method as recited in claim 8, wherein the arranging the statistical analysis result as a category tree to generate the second category model comprises:

determining whether the plurality of commodity categories, the associated attribute categories, and the weights corresponding to the plurality of commodity categories and the associated attribute categories that correspond to the user query reach one or more weight thresholds; and in an event that the one or more weight thresholds are reached, generating the second category model based on the plurality of commodity categories, the associated attribute categories, and the weights corresponding to the plurality of commodity categories and the associated attribute categories that correspond to the user query.

10. A query system based on a vertical search, comprising:
a query server that:
receives a user query;
obtains a first category model from a category model warehouse based on the user query to generate a first query result, the first category model comprising one or more commodity categories that correspond to one or more keywords in the user query;
obtains one or more commodity categories corresponding to the user query from a commodity warehouse to generate a second query result; and
generates a final query result by combining the first query result and the second query result, wherein generating the final query result comprises:
obtaining a first combined result comprising commodity categories that are in both the first query result and the second query result, the first combined result further comprising weights corresponding to the commodity categories in the first combined result and being a combination of weights from the first query result and from the second query result;
obtaining a second combined result comprising commodity categories and corresponding weights in the second query result;
increasing the weights in the first combined result to render the weights corresponding to the commodity categories in the first combined result to be respectively higher than the weights corresponding to the commodity categories in the second combined result; and
arranging the commodity categories in the first combined result according to the weights in the first combined result in a descending order to provide the first combined result to a user;
a log server that generates a log based on the user query and user's clicking operations in response to the final query result; and
a modeling server that generates a second category model from statistical analysis of data in the log.

11. A query system as recited in claim 10, wherein the modeling server transmits the second category model to the query server, wherein the query server provides the final query result to a user, and updates the category model warehouse with the second category model.

12. A query system as recited in claim 10, wherein the first category model comprises one or more attribute categories corresponding to the one or more commodity categories, and wherein the query server obtains one or more commodity categories and attribute categories corresponding to the user query from the commodity warehouse.

13. A query system as recited in claim 10, wherein the query server obtains data on the user's clicking operations with respect to at least one commodity category, attribute categories corresponding to the at least one commodity category, and commodities in response to the final query result, wherein the log server generates the log based on the data on the user's clicking operations, the log comprising the user query and clicking information, the clicking information comprising a commodity category and an attribute category of a commodity clicked on by the user, a commodity category clicked on by the user, and an attribute category clicked on by the user, and wherein the log server further stores the generated log.

14. A query system as recited in claim 10, wherein the modeling server further:
obtains a statistical analysis result based on statistical analysis of the user query and corresponding clicking information in the log, the statistical analysis result comprising a plurality of commodity categories, associated attribute categories, and weights corresponding to the plurality of commodity categories and the associated attribute categories that correspond to the user query, the weights corresponding to the plurality of commodity categories and the associated attribute categories comprising number of clicks on the plurality of commodity categories and the associated attribute categories, clicking probability related to the plurality of commodity categories and the associated attribute categories, or both; and
arranges the statistical analysis result as a category tree to generate the second category model.

15. A query system as recited in claim 14, wherein the modeling server further:
determines whether the plurality of commodity categories, the associated attribute categories, and the weights corresponding to the plurality of commodity categories and the associated attribute categories that correspond to the user query reach one or more weight thresholds; and
in an event that the one or more weight thresholds are reached, generates the second category model based on the plurality of commodity categories, the associated attribute categories, and the weights corresponding to the plurality of commodity categories and the associated attribute categories that correspond to the user query.

16. A query server, comprising:
an acquisition module that obtains a user query;
a query module that, based on the user query, retrieves a category model matching the user query from a category model warehouse, generates a first query result based on the category model, and searches for commodity categories that match the user query in a commodity warehouse to generate a second search result, the category model comprising one or more commodity categories corresponding to one or more keywords in the user query; and
a combination module that combines the first query result and the second query result to generate a final query result, wherein generating the final query result comprises:
 obtaining a first combined result comprising commodity categories that are in both the first query result and the second query result, the first combined result further comprising weights corresponding to the commodity categories in the first combined result and being a combination of weights from the first query result and from the second query result;
 obtaining a second combined result comprising commodity categories and corresponding weights in the second query result;
 increasing the weights in the first combined result to render the weights corresponding to the commodity categories in the first combined result to be respectively higher than the weights corresponding to the commodity categories in the second combined result; and
 arranging the commodity categories in the first combined result according to the corresponding weights in the first combined result in a descending order to provide the first combined result to a user.

17. A query server as recited in claim 16, further comprising a transmission module that:
 transmits the final query result to a user;
 generates a log based on the user query and the user's clicking operations in response to the final query result;
 generates a second category model from statistical analysis of data in the log; and
 updates the category model warehouse with the second category model.

18. A server as recited in claim 16, wherein the first category model comprises one or more attribute categories corresponding to the one or more commodity categories, and wherein the query module obtains one or more commodity categories and associated attribute categories that match the user query.

* * * * *